UNITED STATES PATENT OFFICE.

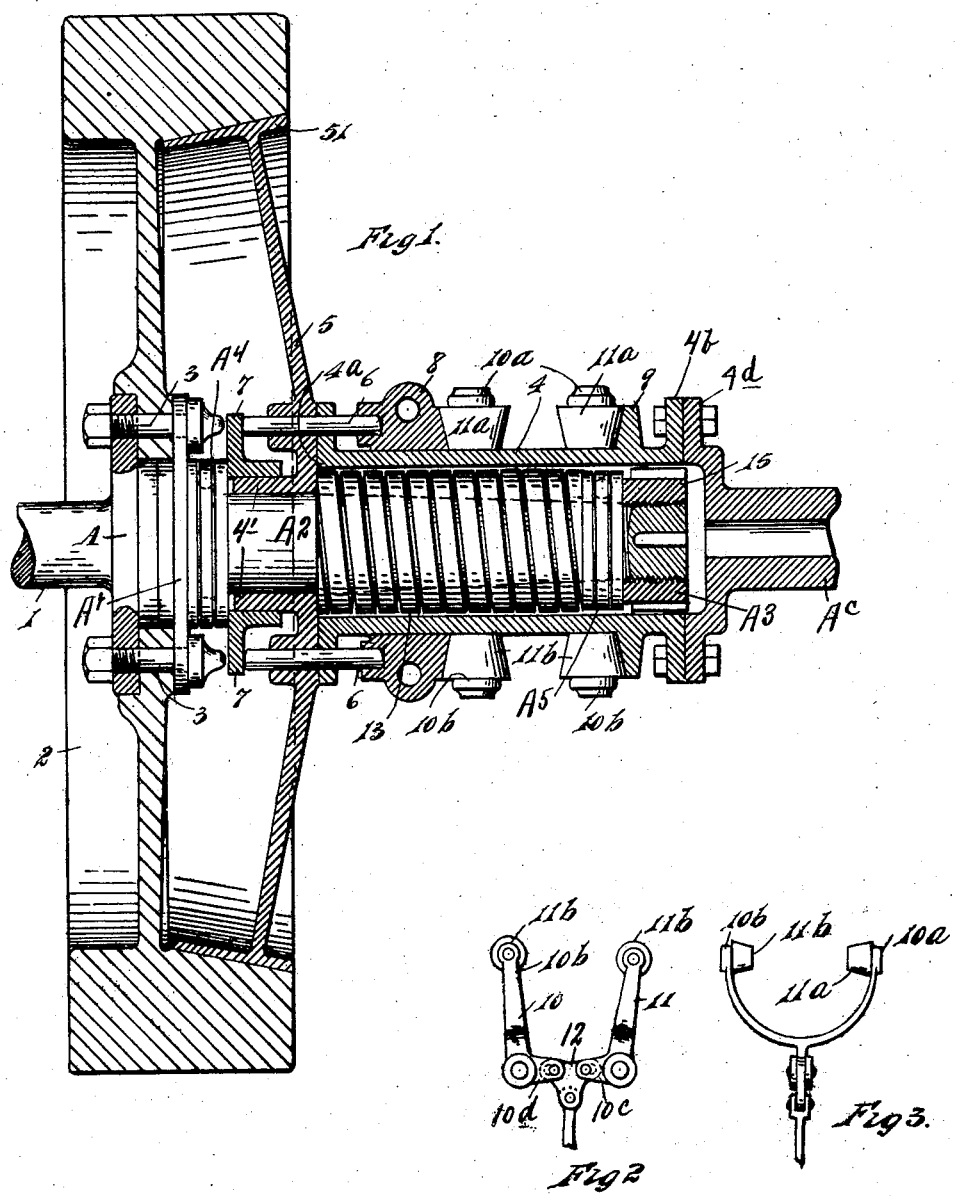

EMIL HUBER, OF DETROIT, MICHIGAN.

CLUTCH.

No. 852,956.  Specification of Letters Patent.  Patented May 7, 1907.

Application filed October 16, 1905. Serial No. 282,920.

*To all whom it may concern:*

Be it known that I, EMIL HUBER, a citizen of the United States, residing at Detroit, county of Wayne, State of Michigan, have invented a certain new and useful Improvement in Clutches; and I declare the following to be a full, clear, and exact description of the same, such as will enable others skilled in the art to which it pertains to make and use the same, reference being had to the accompanying drawings, which form a part of this specification.

My invention relates to clutches and has for its object an improved clutch and one that causes no end thrust upon the engine.

In the drawings:—Figure 1, is a longitudinal section of a clutch embodying my invention and parts adjacent thereto and co-operating therewith. Fig. 2, shows the lever employed to actuate the clutch. Fig. 3, is an elevation of a forked lever or actuator.

1, is a driving shaft, as for instance, the main shaft of a gas engine.

2, is a fly-wheel rigidly secured upon the shaft 1.

A, is a flange upon the end of the shaft 1.

$A^2$, is a short shaft having a flange $A^1$ at one end. The shaft $A^2$ is secured to the shaft 1, axially in line therewith by bolts 3 extending through the flanges A and $A^1$, and through the web of the fly-wheel. The flange of the fly-wheel is formed to constitute one portion of a conical clutch as indicated at 5′.

5, is a clutch-head adapted at its periphery to engage with the conical surface upon the flange of the fly-wheel 2, by motion in the direction of the axis of said fly-wheel.

4′, is a sleeve adapted to turn upon the shaft $A^2$ and forming an integral part of the clutch 5.

15, is a nut upon the end of the shaft $A^2$.

13, is a helical compression spring surrounding the shaft $A^2$ and pressing at one end against the clutch 5 and at the other end against the roller thrust bearing $A^5$ which is against, and held by, the nut 15.

4, is a sleeve inclosing the spring 13 and having at one end a flange $4^a$ which is rigidly bolted to the clutch-head 5, and at the other end a flange $4^b$, which is rigidly bolted to a flange $4^d$ upon the transmission shaft $A^c$.

$A^4$, is a thrust bearing surrounding the shaft $A^2$ between the flange $A^1$ and the sleeve 4′.

7, is a ring sleeved upon the sleeve 41, provided with an outwardly extending flange, and adapted to bear against the thrust bearing $A^4$.

9, is a collar upon the sleeve 4, in the construction shown forming a part of said sleeve.

8, is a ring upon the sleeve 4 adapted to slide longitudinally thereof.

6, 6, are rods or pins secured to the ring 8, by a forced fit in the construction shown, extending through apertures in the flange $4^a$ and the clutch-head 5 and bearing at their inner ends against the side of the flange on the sleeve 4′. The actuator of the clutch engages between the loose ring 8 and the collar 9 and consists of a pair of forked lever heads 10 and 11, each lever head is forked with two branches $10^a$ and $10^b$, and the branches terminate with rollers $11^a$ and $11^b$, said forks are pivoted to any fixed support and are provided with lever arms $10^c$ and $10^d$, which are connected by a toggle 12, said toggle is provided with handles by means of which the levers just mentioned may be actuated to press the ring 8 toward the fly-wheel 2.

The operation of the above described device is as follows:—Normally the spring 13 presses the clutch 5 against, and holds it in engagement with, the conical surface upon the fly-wheel. The pressure of the spring is in one direction against the thrust bearing $A^5$ upon the shaft $A^2$ and in the other direction an equal amount upon the clutch head 5, and through that to the fly-wheel rigidly connected to the shaft $A^2$, so that the two forces of the spring are communicated to the same part and balance each other without being conveyed to the engine. When the clutch-head 5 is in engagement with the wheel 2, the transmission shaft $A^c$ is connected to the driving shaft 1 through the sleeve 4, and said clutch head. When it is desired to disengage the clutch-head, the forked lever heads 10 and 11 are actuated to move the ring 8 toward the fly-wheel 2, pressing the sleeve 7 inward against the thrust bearing $A^4$ by means of the pins 6, 6, and moving the sleeve 4 and shaft $A^c$ longitudinally by means of the pressure of said lever-head against the collar 9, thus drawing the clutch 5 out of engagement with the fly-wheel 2.

When the actuators are released the spring 13 causes the clutch to reëngage. It will be observed that both of the bearings $A^4$ and $A^5$ are inclosed and protected from dust and dirt.

What I claim is:—

1. The combination of a driving shaft 1, $A^2$, a driven shaft 4, $A^c$, a clutch member on each of said shafts adapted to engage to bind said shafts together, a spring 13 interposed between said shafts and tending to force them in opposite directions to engage said clutch members, and an actuator upon one of said shafts acting against the other of said shafts to press said shafts apart to disengage the clutches.

2. The combination of a driving shaft 1, $A^2$, a driven shaft 4, $A^c$ having a sleeve 4 surrounding a part of the driving shaft, a spring surrounding said driving shaft within the sleeve 4, a thrust bearing within said sleeve interposed between said spring and the driving shaft, said spring acting at the other end against the driven shaft, a clutch member 5 on the driven shaft, a corresponding clutch member upon the driving shaft, a thrust bearing inclosed by said clutch member, an actuating member extending through one of said clutch members adapted to act upon said thrust bearing, and means for operating said actuating member, for the purpose described.

3. The combination of a driving shaft 1, $A^2$, a driven shaft 4, $A^c$ having a sleeve 4 surrounding a part of the driving shaft, a spring surrounding said driving shaft within the sleeve 4, said spring acting at the other end against the driven shaft, a clutch member 5 on the driven shaft, a corresponding clutch member upon the driving shaft, a thrust bearing inclosed by said clutch members, an actuating member extending through one of said clutch members adapted to act upon said thrust bearing, and means for operating said actuating member, for the purpose described.

In testimony whereof, I, sign this specification in the presence of two witnesses.

EMIL HUBER.

Witnesses:
LOTTA LEE HAYTON,
ELLIOTT J. STODDARD.